US012192694B2

(12) United States Patent
Lu

(10) Patent No.: US 12,192,694 B2
(45) Date of Patent: Jan. 7, 2025

(54) MULTIFUNCTIONAL BONE CONDUCTION EARPHONE

(71) Applicant: Shenzhen MoreinTech Co., Ltd, Shenzhen (CN)

(72) Inventor: Haijun Lu, Shenzhen (CN)

(73) Assignee: Shenzhen MoreinTech Co., Ltd., Shenzhen (CN)

( * ) Notice: Subject to any disclaimer, the term of this patent is extended or adjusted under 35 U.S.C. 154(b) by 205 days.

(21) Appl. No.: 18/145,112

(22) Filed: Dec. 22, 2022

(65) Prior Publication Data

US 2024/0022848 A1 Jan. 18, 2024

(30) Foreign Application Priority Data

Jul. 18, 2022 (CN) ......................... 202221849448.7

(51) Int. Cl.
*H04R 1/10* (2006.01)

(52) U.S. Cl.
CPC ......... *H04R 1/105* (2013.01); *H04R 2460/13* (2013.01)

(58) Field of Classification Search
CPC .... H04R 1/105; H04R 2460/13; H04R 5/033; H04R 1/1066; H04R 1/1016; H04R 5/0335; H04R 1/10; H04R 1/26
See application file for complete search history.

(56) References Cited

FOREIGN PATENT DOCUMENTS

| | | | | | |
|---|---|---|---|---|---|
| CN | 1980487 A | * | 6/2007 | ............... | H04R 1/26 |
| CN | 205408101 U | | 7/2016 | | |
| CN | 206100395 U | | 4/2017 | | |
| CN | 209419804 U | * | 9/2019 | ............... | H04R 1/10 |
| CN | 215072927 U | * | 12/2021 | ............... | H04R 1/10 |
| CN | 115334395 A | | 11/2022 | | |

* cited by examiner

*Primary Examiner* — Angelica M McKinney

(57) ABSTRACT

The present invention discloses a multifunctional bone conduction earphone, including a left earphone body, a right earphone body and speaker position adjustment mechanisms. The left earphone body includes a left ear hanger body; the right earphone body includes a right ear hanger body; and the speaker position adjustment mechanisms are arranged on the ear hanging bodies and used for adjusting positions of speaker bodies. In a relatively noisy environment, the speaker position adjustment mechanisms are adjusted, so that the speaker bodies cover ears, thereby playing a role of shielding external sounds and avoiding interference from the external sounds.

3 Claims, 7 Drawing Sheets

MULTIFUNCTIONAL BONE CONDUCTION EARPHONE

TECHNICAL FIELD

The present invention relates to an earphone, in particular to a multifunctional bone conduction earphone.

BACKGROUND OF THE PRESENT INVENTION

There are mainly two kinds of earphones of sound conduction modes in the field of earphones. The first kind of earphones is an air conduction earphone, which is generally in-ear or covers the whole ear; the air conduction earphone emits sound waves, which pass through external auditory canals and act on eardrums; the sound waves cause vibration of the eardrums; and the vibration of the eardrums transmits sounds into *cochleae* and auditory nerves. The second kind of earphones is a bone conduction earphone, which is in contact with human skin; and vibration waves pass through the human skin and bones, and then are transmitted into the *cochleae* and auditory nerves. The air conduction earphone needs to be placed in an ear or cover the whole ear, so other sounds are shielded in the process of using the air conduction earphone, and the user cannot hear other useful sounds or hears very little other sounds, which brings inconvenience to the user. For example, when the air conduction earphone is used for answering a phone, the reception of other sounds will be affected, and the ear will feel uncomfortable after the air conduction earphone is used for a long time, thereby bringing poor user experience to the user. The bone conduction earphone conducts sounds through the skin and bones, and is not placed in the ear or does not cover the whole ear, to solve the problem of shielding other sounds by the air conduction earphone and avoid causing discomfort to the ear. However, if external interference sounds are directly received by the user through the ear in a relatively noisy environment, the user will be interfered to a certain extent, thereby affecting the effect of receiving the sounds from the bone conduction earphone for the user and reducing the user experience. To solve the above problems, the user needs to prepare two pairs of earphones, i.e., one pair of air conduction earphones and one pair of bone conduction earphones, so that the user selects different types of earphones according to different environments, but this will increase the cost of the user and bring inconvenience to the user. Therefore, an earphone is needed in the market so that the user can select corresponding conduction modes according to different external environments on the same pair of earphones.

SUMMARY OF PRESENT INVENTION

The present invention provides a multifunctional bone conduction earphone, which is used for solving problems that external sounds will interfere with a user when a bone conduction earphone is used in a relatively noisy environment, an air conduction earphone will shield external useful sounds in a relatively quiet environment and will cause discomfort of ears after long-term wearing, and the user cannot select the corresponding conduction modes according to different external environments on the same pair of earphones.

In one aspect, the present invention provides a multifunctional bone conduction earphone, including:

a left earphone body, including a left speaker body and a left ear hanger body, wherein one end of the left ear hanger body is fixedly connected with the left speaker body;

a right earphone body, including a right speaker body and a right ear hanger body, wherein one end of the right ear hanger body is fixedly connected with the right speaker body; and speaker position adjustment mechanisms, including a left speaker position adjustment mechanism arranged on the left ear hanger body and/or a right speaker position adjustment mechanism arranged on the right ear hanger body, wherein the left speaker position adjustment mechanism is used for adjusting the position of the left speaker body, and the right speaker position adjustment mechanism is used for adjusting the position of the right speaker body.

Further, the left speaker position adjustment mechanism is a left damping adjustment mechanism; and/or the right speaker position adjustment mechanism is a right damping adjustment mechanism.

Further, the left ear hanger body includes a first left ear hanger body and a second left ear hanger body; and the left damping adjustment mechanism includes a left damping rotating shaft. In the first left ear hanger body and the second left ear hanger body, at least the first left ear hanger body is rotatably and fixedly connected with the left damping rotating shaft; and one end of the first left ear hanger body away from the left damping rotating shaft is fixedly connected with the left speaker body.

Further, the left damping adjustment mechanism includes a first left rotating rod and a second left rotating rod. The first left ear hanger body is rotatably and fixedly connected with the left damping rotating shaft through the first left rotating rod; and the second left ear hanger body is fixedly connected with the left damping rotating shaft through the second left rotating rod.

Further, a first control groove is formed in the first left rotating rod; and a first control part is fixedly arranged on the second left rotating rod. One end of the first control part extends into the first control groove; and the first control part and the first control groove are used for controlling a rotation angle of the first left rotating rod relative to the second left rotating rod.

Further, the rotation angle of the first left rotating rod relative to the second left rotating rod is not greater than 60 degrees; and a force required for pushing the first left rotating rod to rotate relative to the second left rotating rod is not greater than 15N. An acting point of the pushing force is located on the left speaker body; the pushing force is perpendicular to the left damping rotating shaft; and the pushing force is perpendicular to a connecting line between the acting point and a center of the left damping rotating shaft.

Further, the right ear hanger body includes a first right ear hanger body and a second right ear hanger body; and the right damping adjustment mechanism includes a right damping rotating shaft. In the first right ear hanger body and the second right ear hanger body, at least the first right ear hanger is rotatably and fixedly connected with the right damping rotating shaft; and one end of the first right ear hanger body away from the right damping rotating shaft is fixedly connected with the right speaker body.

Further, the right damping adjustment mechanism includes a first right rotating rod and a second right rotating rod. The first right ear hanger body is rotatably and fixedly connected with the right damping rotating shaft through the first right rotating rod; and the second right ear hanger body is fixedly connected with the right damping rotating shaft through the second right rotating rod.

Further, a second control groove is formed in the first right rotating rod; and a second control part is fixedly arranged on the second right rotating rod. One end of the second control part extends into the second control groove; and the second control part and the second control groove are used for controlling a rotation angle of the first right rotating rod relative to the second right rotating rod.

Further, the rotation angle of the first right rotating rod relative to the second right rotating rod is not greater than 60 degrees; and a force required for pushing the first right rotating rod to rotate relative to the second right rotating rod is not greater than 15N. An acting point of the pushing force is located on the right speaker body; the pushing force is perpendicular to the right damping rotating shaft; and the pushing force is perpendicular to a connecting line between the acting point and a center of the right damping rotating shaft.

The present invention has beneficial effects that:

The speaker position adjustment mechanisms include the left speaker position adjustment mechanism and the right speaker position adjustment mechanism. The left speaker position adjustment mechanism can be used for adjusting the position of the left speaker body; and the right speaker position adjustment mechanism can be used for adjusting the position of the right speaker body. Therefore, in a relatively noisy environment, the speaker position adjustment mechanisms are adjusted, so that the speaker bodies cover the ears, to play a role of shielding the external sounds and avoid the interference from the external sounds. The vibration of the bone conduction earphone will cause vibration of tragi and other parts of the ears, which will be transmitted to the *cochleae* and auditory nerves through the bones; and the vibration of the bone conduction earphone will also emit sound waves. Because the speaker bodies are located outside the external auditory canals, the sound waves will directly spread in the air inside the external auditory canals, to cause the vibration of the eardrums, which will then be transmitted to the *cochleae* and auditory nerves. When the external sounds are shielded, the bone conduction earphone will increase the amplitude of the sounds through the superposition of the bone conduction mode and the air conduction mode, so that the sounds are louder.

In a relatively noisy environment, if the user wants to shield the external noise to a certain extent without missing other useful sounds, the user can choose to adjust only one speaker position adjustment mechanism to cover the corresponding ear. When the noise is mainly emitted from the left, the left speaker position adjustment mechanism can be adjusted to only cover the left ear; and when the noise is mainly emitted from the right, the right speaker position adjustment mechanism can be adjusted to only cover the right ear.

In a relatively quiet environment, the speaker position adjustment mechanisms are adjusted, so that the speaker bodies keep away from the ears, only a bone conduction function is used to avoid discomfort of the ears caused by long-term wearing, and the user can also hear other sounds besides the earphone sound to avoid missing other useful sounds.

According to the present invention, only one pair of earphones is required to select corresponding conduction modes by adjusting the speaker position adjustment mechanisms according to different external environments and making the speaker bodies cover or keep away from the ears.

DESCRIPTION OF THE DRAWINGS

The accompanying drawings forming a part of the present application are used for providing a further understanding on the present invention; and the illustrative embodiments of the present invention and descriptions thereof are used for explaining the present invention, without unduly limiting the present invention. In the accompanying drawings.

In the figures: 1-elastic connecting piece; 2-left earphone assembly; 21-left earphone body; 211-left speaker body; 212-left ear hanger body; 2121-first left ear hanger body; 2122-second left ear hanger body; 213-left ear circuit body; 214-left damping adjustment mechanism; 2141-first left rotating rod; 2142-second left rotating rod; 2143-left damping rotating shaft; 2144-first control groove; 2145-first control part; 215-gear set mechanism; 2151-first rotating arm; 2152-first gear wheel; 2153-second rotating arm; 2154-second gear wheel; 221-left speaker body protection sleeve; 222-left ear hanger body protection sleeve; 223-left ear circuit body protection sleeve; and 3-right earphone assembly; and 31-right earphone body, and 311-right speaker body, and 312-right ear hanger body.

DETAILED DESCRIPTION OF PREFERRED EMBODIMENTS

It should be noted that embodiments in the present application and features in the embodiments can be combined with each other in case of no conflict. The present invention will be described in detail below with reference to the accompanying drawings and the embodiments.

It should be noted that unless otherwise specified, all technical and scientific terms used in the present application have the same meanings as commonly understood by those ordinary skilled in the art.

In the present invention, unless otherwise stated, the locative words such as "upper, lower, top and bottom" are usually used for indicating the directions shown in the accompanying drawings, or indicating the components in the vertical, perpendicular or gravity direction. Similarly, for the convenience of understanding and description, "inside and outside" refer to the inside and outside relative to the outline of each component. However, the above-mentioned locative words are not used for limiting the present invention.

Figure 1:
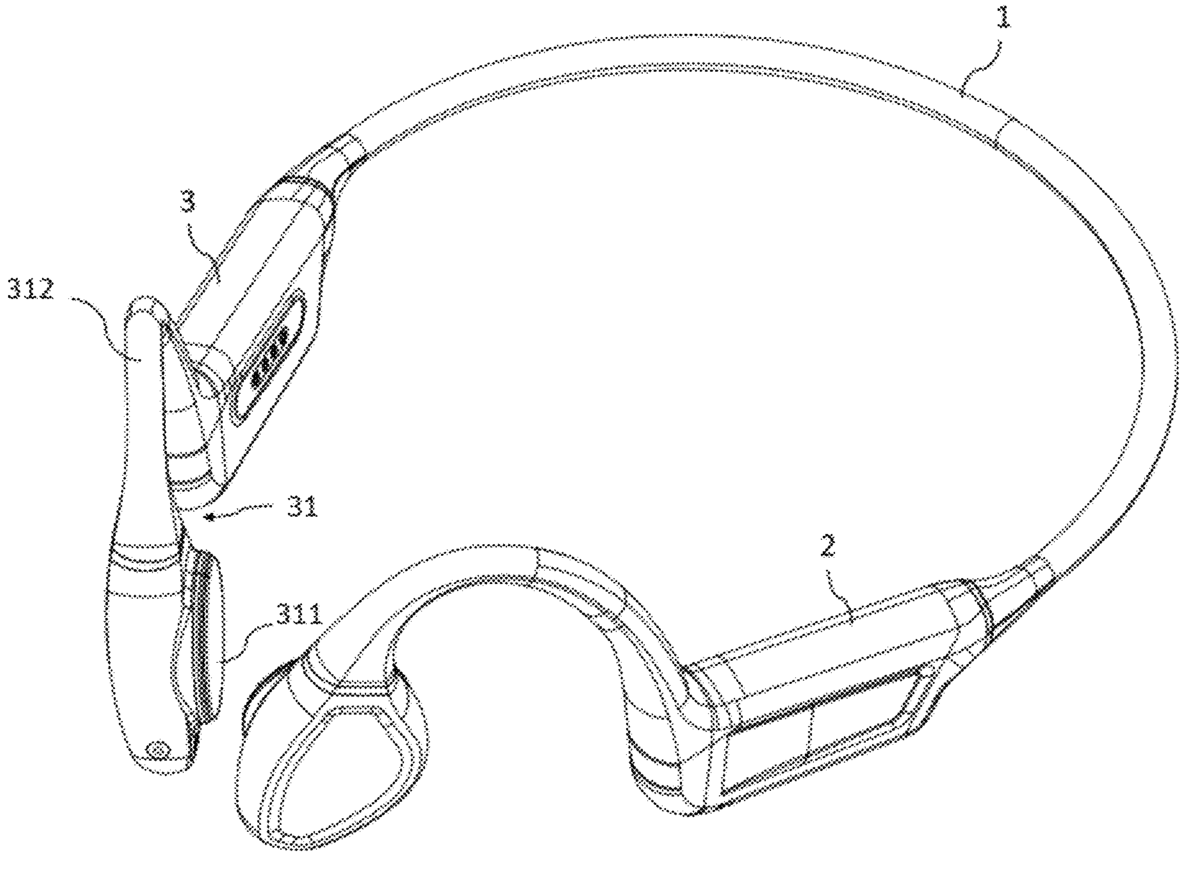
FIG. 1 is a three-dimensional structural schematic diagram of a multifunctional bone conduction earphone according to the present invention.
Figure 2:
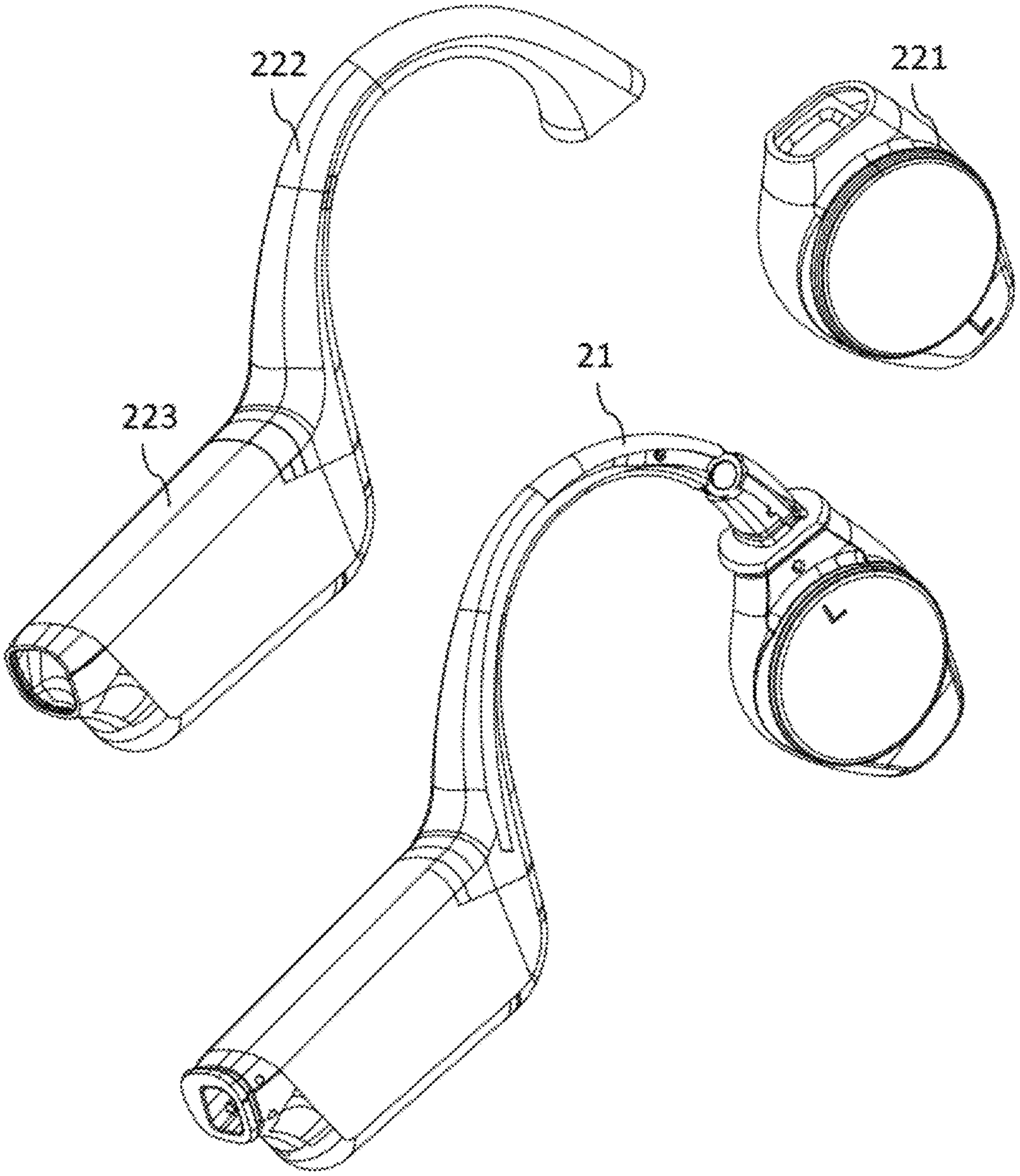
FIG. 2 is a three-dimensional structural exploded view of a left earphone assembly according to the present invention.
Figure 3:
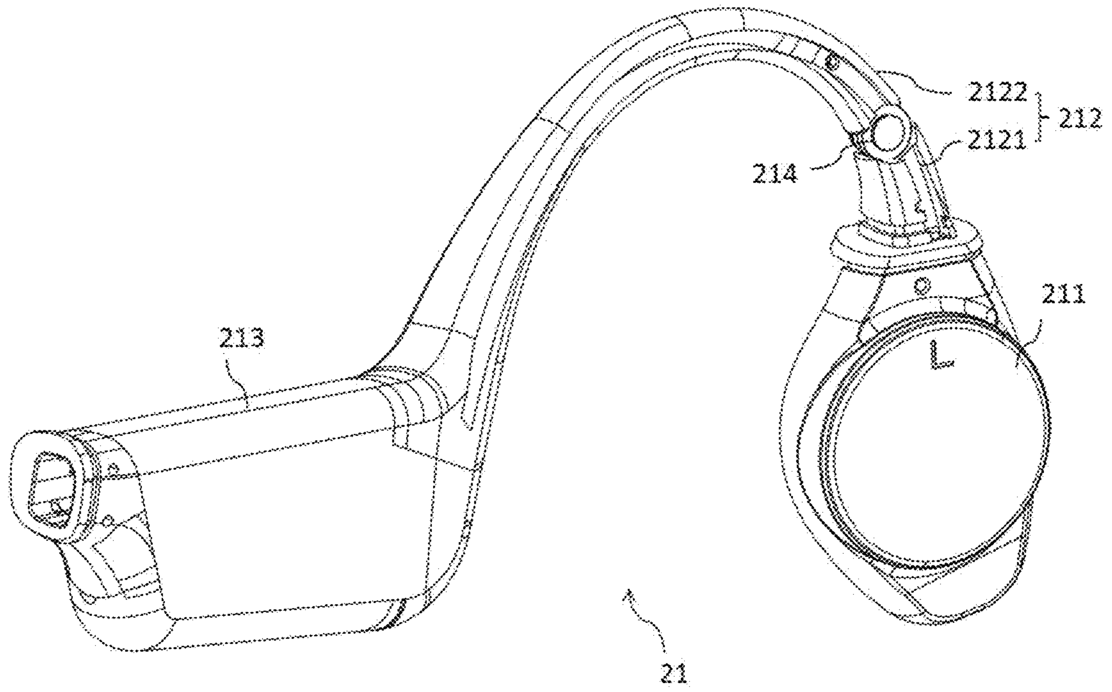
FIG. 3 is a three-dimensional structural schematic diagram of a left earphone body according to the present invention.

Referring to FIGS. 1-3, in one aspect, the present invention provides a multifunctional bone conduction earphone, including a left earphone assembly 2 and a right earphone assembly 3. The left earphone assembly 2 includes a left earphone body 21 and a left protection sleeve; and the right earphone assembly 3 includes a right earphone body 31 and a right protection sleeve.

The left earphone body 21 includes a left speaker body 211, a left ear hanger body 212 and a left ear circuit body 213. One end of the left ear hanger body 212 is fixedly connected with the left speaker body 211; and the other end of the left ear hanger body 212 is fixedly connected with the left ear circuit body 213. The left earphone body 21 can be used directly, and can also be used after a protection sleeve is assembled outside the left earphone body 21 to form the left earphone assembly 2.

The right earphone body 31 includes a right speaker body 311, a right ear hanger body 312 and a right ear circuit body. One end of the right ear hanger body 312 is fixedly connected with the right speaker body 311; and the other end of the right ear hanger body 312 is fixedly connected with the right ear circuit body. The right earphone body 31 can be directly used, and can also be used after a protection sleeve is assembled outside the right earphone body 31 to form the right earphone assembly 3.

The multifunctional bone conduction earphone further includes an elastic connecting piece 1; one end of the elastic connecting piece 1 is detachably and fixedly connected with the left ear circuit body 213; and the other end of the elastic connecting piece 1 is detachably and fixedly connected with the right ear circuit body. When the multifunctional bone conduction earphone is worn, the elastic connecting piece 1 is used for fixing the left earphone body 21 and the right earphone body 31 to the corresponding positions of the head of a user.

The multifunctional bone conduction earphone further includes speaker position adjustment mechanisms which include a left speaker position adjustment mechanism arranged on the left ear hanger body 212 and/or a right speaker position adjustment mechanism arranged on the right ear hanger body 312. The left speaker position adjustment mechanism is used for adjusting the position of the left speaker body 211; and the right speaker position adjustment mechanism is used for adjusting the position of the right speaker body 311.

The left ear hanger body 212 and the left speaker position adjustment mechanism are split and composed of a plurality of parts. For example, a damping adjustment mechanism can be adopted to adjust the speaker position through the rotation of the parts at two sides of a damper; or, a gear set mechanism 215 can also be adopted to adjust the speaker position through the relative rotation of gear wheels in a gear set.

Similarly, the right ear hanger body 312 and the right speaker position adjustment mechanism can be split and composed of a plurality of parts. For example, the damping adjustment mechanism can be adopted to adjust the speaker position through the rotation of parts at two sides of the damper; or, the gear set mechanism 215 can also be adopted to adjust the speaker position through the relative rotation of the gear wheels in the gear set.

The left ear hanger body 212 and the left speaker position adjustment mechanism can also be integrated, can be a part, can be made of flexible materials such as copper sheets or pure aluminum sheets, and can keep fixed after being bent and deformed, wherein the copper sheets or pure aluminum sheets are flexible in texture, have a thickness direction roughly parallel to a face of the user, and are easily bent due to the relatively thin thickness direction. The positions of the speaker bodies are adjusted by bending the copper sheets or flexible aluminum sheets. The copper sheets or pure aluminum sheets have a certain width in a width direction. Preferably, when the multifunctional bone conduction earphone is worn on the head of the user, the copper sheets or pure aluminum sheets have certain rigidity in the width direction; and the width direction of the copper sheets or pure aluminum sheets is roughly perpendicular to the face of the user. When the bone conduction earphone provides a certain clamping force to the human head, the copper sheets or pure aluminum sheets will not deform apparently in the width direction, thereby providing good support.

The speaker position adjustment mechanisms include the left speaker position adjustment mechanism and the right speaker position adjustment mechanism. The left speaker position adjustment mechanism can be used for adjusting the position of the left speaker body 211; and the right speaker position adjustment mechanism can be used for adjusting the position of the right speaker body 311. Therefore, in a relatively noisy environment, the speaker position adjustment mechanisms are adjusted, so that the speaker bodies cover the ears, to play a role of shielding external sounds and avoid the interference from the external sounds. The vibration of the bone conduction earphone will cause vibration of tragi and other parts of the ears, which will be transmitted to the *cochleae* and auditory nerves through the bones; and the vibration of the bone conduction earphone will also emit sound waves. Because the speaker bodies are located outside the external auditory canals, the sound waves will directly spread in the air inside the external auditory canals, to cause the vibration of the eardrums, which will then be transmitted to the *cochleae* and auditory nerves. When the external sounds are shielded, the bone conduction earphone will increase the amplitude of the sounds through the superposition of a bone conduction mode and an air conduction mode, so that the sounds are louder.

In a relatively noisy environment, if the user wants to shield the external noise to a certain extent without missing other useful sounds, the user can choose to adjust only one speaker position adjustment mechanism to cover the corresponding ear. When the noise is mainly emitted from the left, the left speaker position adjustment mechanism can be adjusted to only cover the left ear; and when the noise is mainly emitted from the right, the right speaker position adjustment mechanism can be adjusted to only cover the right ear.

In a relatively quiet environment, the speaker position adjustment mechanisms are adjusted, so that the speaker bodies keep away from the ears, only a bone conduction function is used to avoid discomfort of the ears caused by long-term wearing, and the user can also hear other sounds besides the earphone sound to avoid missing other useful sounds.

According to the present invention, only one pair of earphones is required to select corresponding conduction modes by adjusting the speaker position adjustment mechanisms according to different external environments and making the speaker bodies cover or keep away from the ears.

In one embodiment, a left protection sleeve is arranged on the left earphone body 21; and/or a right protection sleeve is arranged on the right earphone body 31. The left protection sleeve covers at least the outer surface of a portion of the left speaker body 211 facing the user; and the right protection sleeve covers at least the outer surface of a portion of the right speaker body 311 facing the user.

The left protection sleeve and the right protection sleeve are made of flexible materials. The flexible materials can be silica gel, rubber or other flexible materials, preferably flexible materials with high elasticity, to facilitate the assembly and disassembly of the left protection sleeve and the right protection sleeve.

Hardness of the flexible materials affects the transmitted sound quality. The higher the hardness of the flexible materials is, the stronger the ability to transmit high-frequency vibration is; and the lower the hardness of the flexible materials is, the stronger the ability to transmit low-frequency vibration is. Different sound quality can be obtained by selecting flexible materials with different hardness. The hardness Shore of the flexible materials is preferably 35-55, more preferably 40-50, and further preferably 42-48.

The protection sleeves are detachably arranged on the earphone bodies. The earphone bodies include a left earphone body 21 and a right earphone body 31. The left protection sleeve is arranged on the left earphone body 21; and the right protection sleeve is arranged on the right earphone body 31. The protection sleeves can protect the earphone bodies and prevent water or sweat from entering the earphone bodies and damaging the speakers or other electronic elements in the earphone bodies. The protection sleeves are detachably connected, so that the user can select favorite colors and patterns according to the own preferences; and on the other hand, the user can replace with new protection sleeves when the protection sleeves are aged or damaged after a long time of use.

The protection sleeves can be integrated or split. When the protection sleeves are split, the left protection sleeve includes a left speaker body protection sleeve 221, a left ear hanger body protection sleeve 222 and a left ear circuit body protection sleeve 223, wherein the left speaker body protection sleeve 221 and the left ear hanger body protection sleeve 222 can be integrated; or, the left ear hanger body protection sleeve 222 and the left ear circuit body protection sleeve 223 can be integrated.

Similarly, the right protection sleeve includes a right speaker body protection sleeve, a right ear hanger body protection sleeve and a right ear circuit body protection sleeve, wherein the right speaker body protection sleeve and the right ear hanger body protection sleeve can be integrated; or the right ear hanger body protection sleeve and the right ear circuit body protection sleeve can be integrated.

When the protection sleeves are assembled on the earphone bodies, each protection sleeve covers at least the out surface of a portion of a speaker body facing the user; the flexible protection sleeves can transmit vibration and have functions of a vibration transmission layer, so that the vibration transmission lay can be omitted. The thickness of the protection sleeve has certain influence on the transmitted sound quality. The thicker the protection sleeve is, the higher the quality is, the lower the resonance frequency is, and the apparent the bass effect is. The thinner the protection sleeve is, the lower the quality is, the higher the resonance frequency is, and the apparent the treble effect is. The thickness of the protection sleeve is 0.1 mm-1.5 mm, preferably 0.15 mm-0.8 mm, more preferably 0.2 mm-0.5 mm. The user can select protection sleeves with different thicknesses according to the own preference for treble and bass.

The left protection sleeve and the right protection sleeve can be arranged separately or together. When the left protection sleeve and the right protection sleeve are arranged separately, timbres and tones of the sound emitted from the left and right sides of the bone conduction earphone are different. When the left protection sleeve and the right protection sleeve are arranged at the same time, the left protection sleeve and the right protection sleeve can be the same or different in thickness and hardness. When the left protection sleeve and the right protection sleeve are different in thickness and/or hardness, timbres and tones are also different; and different timbres and tones are suitable for different special players.

Figure 4:
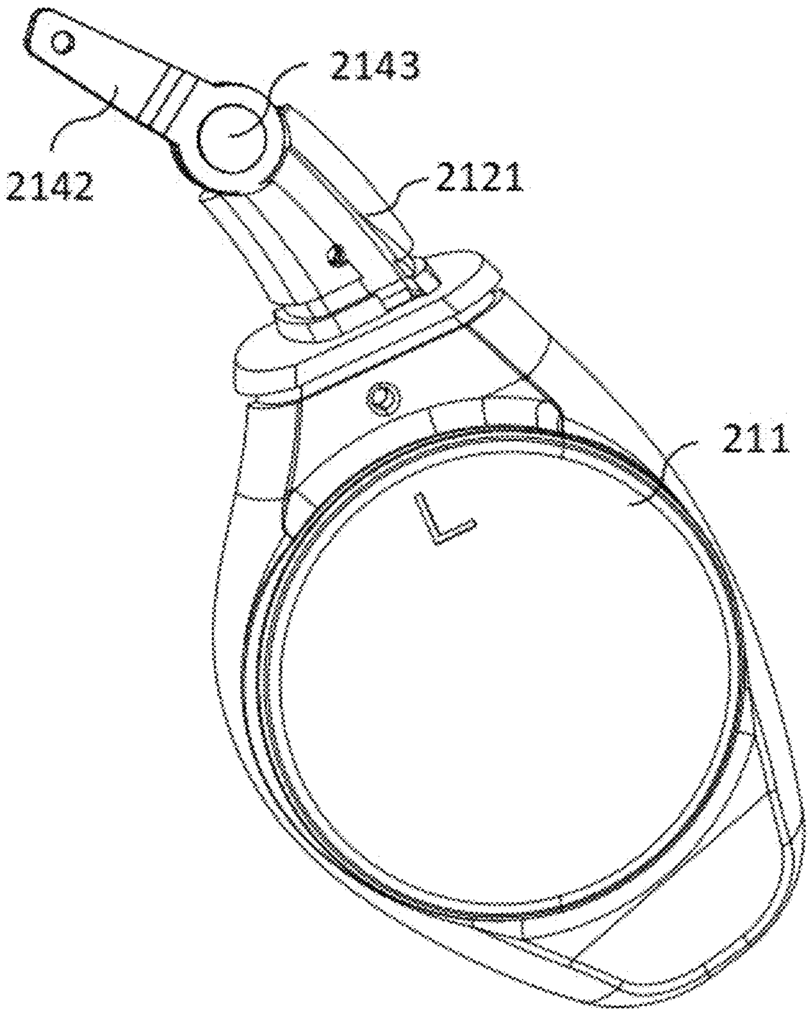
FIG. 4 is a three-dimensional structural schematic diagram of an assembly part of a left damping adjustment mechanism, a first left rotating rod and a left speaker body according to the present invention.
Figure 5:
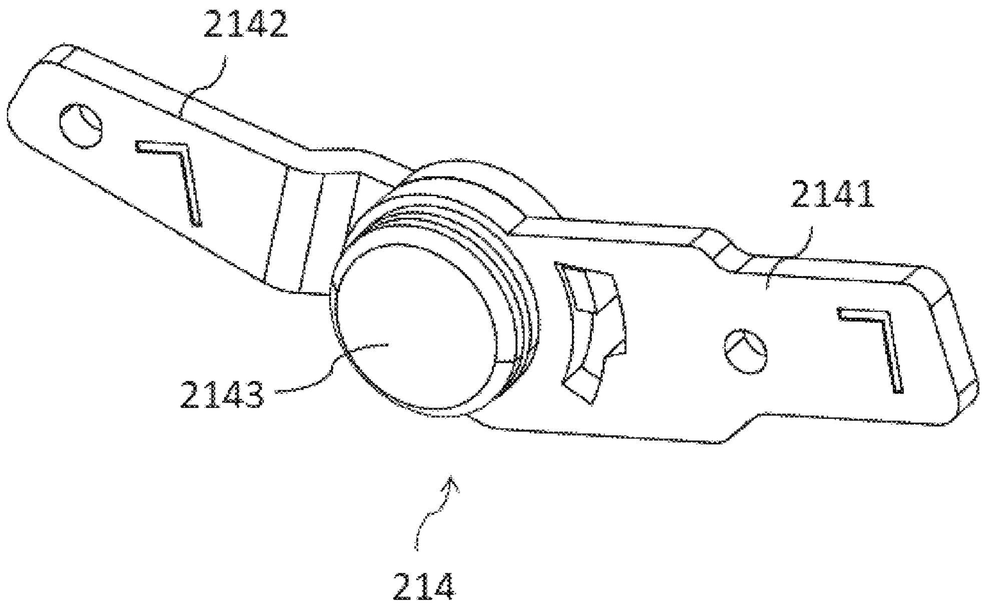
FIG. 5 is a three-dimensional structural schematic diagram 1 of the left damping adjustment mechanism according to the present invention.

In one embodiment, referring to FIGS. 3-5, the left speaker position adjustment mechanism is a left damping adjustment mechanism 214; and the right speaker position adjustment mechanism is a right damping adjustment mechanism. Only the left damping adjustment mechanism 214 is arranged on the left ear hanger body 212 to only adjust the position of the left speaker body 211; or, only the right damping adjustment mechanism is arranged on the right ear hanger body 312 to only adjust the position of the right speaker body 311; or, the damping adjustment mechanisms are arranged at both sides to adjust the positions of the left speaker body 211 and the right speaker body 311 at the same time.

Preferably, the left damping adjustment mechanism 214 includes a first left rotating rod 2141, a second left rotating rod 2142 and a left damping rotating shaft 2143. The first left rotating rod 2141 and the second left rotating rod 2142 are rotatably fixed on the left damping rotating shaft 2143. The left ear hanger body 212 includes a first left ear hanger body 2121 and a second left ear hanger body 2122; one end of the first left ear hanger body 2121 is fixedly connected with the left speaker body 211; and the other end of the first left ear hanger body 2121 is fixedly connected with the first left rotating rod 2141. One end of the second left ear hanger body 2122 is fixedly connected with the second left rotating rod 2142; and the other end of the second left ear hanger body 2122 is fixedly connected with the left ear circuit body 213.

Alternatively, the first left ear hanger body 2121 can be directly and fixedly connected with the left damping rotating shaft 2143; and the second left ear hanger body 2122 can be directly and fixedly connected with the left damping rotating shaft 2143, thereby omitting the first left rotating rod 2141 and the second left rotating rod 2142. The first left ear hanger body 2121 and the second left ear hanger body 2122 rotate relative to the left damping rotating shaft 2143; or, the second left rotating rod 2142 is fixedly connected with the left damping rotating shaft 2143 and cannot rotate, and only the first left ear hanger body 2121 can rotate about the left damping rotating shaft 2143.

Figure 6:
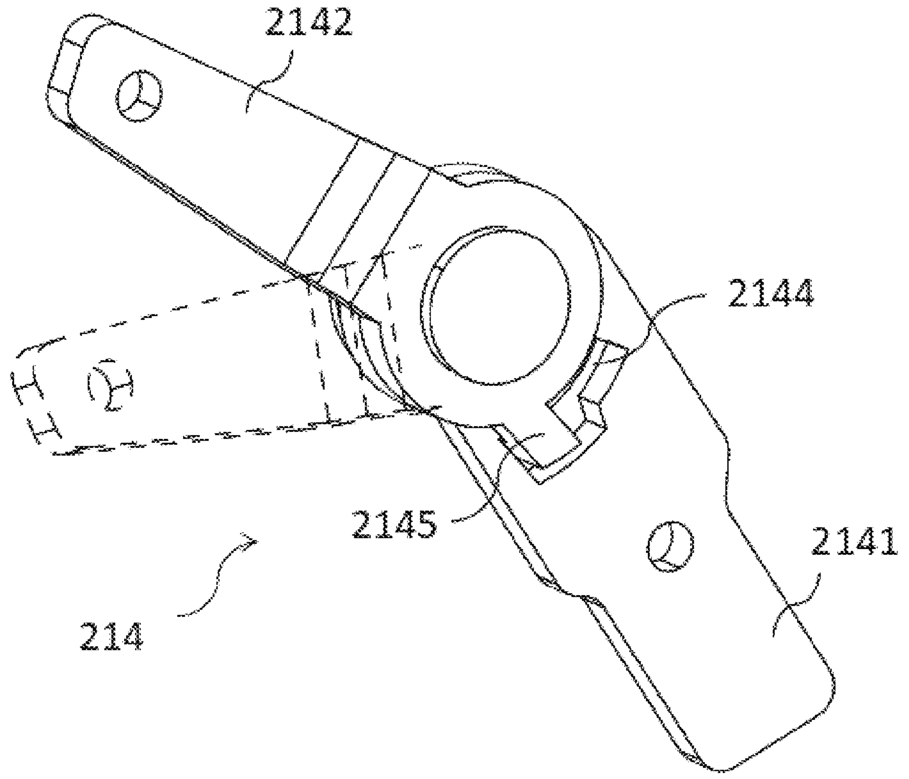
FIG. 6 is a three-dimensional structural schematic diagram 2 of the left damping adjustment mechanism according to the present invention.

Referring to FIG. 6, the left damping adjustment mechanism 214 includes angle control mechanisms arranged on the first left rotating rod 2141 and the second left rotating rod 2142. Specifically, a first control groove 2144 is formed in the first left rotating rod 2141; and a first control part 2145 is fixedly arranged on the second left rotating rod 2142. The first control part 2145 is an extended long-strip-like portion, is bent at a foremost end of the long-strip-like portion toward the first control groove 2144, and extends into the first control groove 2144. As the first left rotating rod 2141 rotates about the left damping rotating shaft 2143 relative to the second left rotating rod 2142, the bent portion of the first control part 2145 can move in the first control groove 2144. When the bent portion of the first control part 2145 moves to one end of the first control groove 2144 and is blocked by the first control groove 2144, the first left rotating rod 2141 moves to a maximum distance relative to the second left rotating rod 2142 in this direction. Similarly, when the bent portion of the first control part 2145 moves to the other end of the first control groove 2144 and is blocked by the other end of the first control groove 2144, the first left rotating rod 2141 moves to a maximum distance relative to the second left rotating rod 2142 in the other direction. An angle formed by connecting lines between the two maximum distances and the damping rotating shafts is a maximum angle that the first left rotating rod 2141 can rotate relative to the second left rotating rod 2142.

A rotation angle of the first left rotating rod 2141 relative to the second left rotating rod 2142 can be controlled by controlling a length of the first control groove 2144. The longer the first control groove 2144 is, the larger the maximum rotation angle is, and vice versa. Preferably, the maximum rotation angle of the first left rotating rod 2141 relative to the second left rotating rod 2142 is 90 degrees, preferably 5-60 degrees, more preferably 5-45 degrees, further preferably 5-30 degrees.

A lowest position where the first left rotating rod 2141 is rotated relative to the second left rotating rod 2142 can be set as a position where the ears are located, so that when the ears need to be covered, only the first left rotating rod 2141 needs to be rotated to the lowest position. Alternatively, a middle position where the first left rotating rod 2141 is rotated relative to the second left rotating rod 2142 can be set as the position where the ears are located. Different people have different head sizes, so different rotation angles are needed. Each user can make adjustments according to the own situation.

A pushing force required to push the first left rotating rod 2141 to rotate relative to the second left rotating rod 2142 can be adjusted by adjusting the left damping rotating shaft 2143. Preferably, the force required to push the first left rotating rod 2141 to rotate relative to the second left rotating rod 2142 is not greater than 15 N, preferably 1 N-15N, more preferably 2 N-10 N, still more preferably 3 N-8 N, further preferably 5 N-8 N. An acting point of the pushing force is located on the left speaker body 211; the pushing force is perpendicular to the left damping rotating shaft 2143; and the pushing force is perpendicular to a connecting line between the acting point and a center of the left damping rotating shaft 2143.

If the required minimum pushing force is too small, less than 1 N, the first left rotating rod 2141 will rotate during use of the user, such as during running, thereby affecting the use. If the required minimum pushing force is too large, greater than 15 N, it is difficult to push, thereby bringing inconvenience to the user.

In one embodiment, the right earphone body 31 further includes a right ear circuit body. The right damping adjustment mechanism includes a first right rotating rod, a second right rotating rod and a right damping rotating shaft; and the first right rotating rod and the second right rotating rod are rotatably fixed on the right damping rotating shaft. The right ear hanger body 312 includes a first right ear hanger body and a second right ear hanger body; one end of the first right ear hanger body is fixedly connected with the right speaker body 311; and the other end of the first right ear hanger body is fixedly connected with the first right rotating rod. One end of the second right ear hanger body is fixedly connected with the second right rotating rod; and the other end of the second right ear hanger body is fixedly connected with the right ear circuit body. (The structure of the right earphone body 31 is similar to that of the left earphone body 21, not shown in the figure).

Alternatively, the first right ear hanger body can be directly and fixedly connected with the right damping rotating shaft; and the second right ear hanger body can be directly and fixedly connected with the right damping rotating shaft, thereby omitting the first right rotating rod and the second right rotating rod. The first right ear hanger body and the second right ear hanger body rotate relative to the right damping rotating shaft; or, the second right rotating rod is fixedly connected with the right damping rotating shaft and cannot rotate, and only the first right ear hanger body can rotate about the right damping rotating shaft.

Similarly, the right damping adjustment mechanism includes angle control mechanisms arranged on the first right rotating rod and the second right rotating rod. Specifically, a second control groove is formed in the first right rotating rod; and a second control part is fixedly arranged on the second right rotating rod. The second control part is an extended long-strip-like portion, is bent at a foremost end of the long-strip-like portion toward the second control groove, and extends into the second control groove. As the first right rotating rod rotates about the damping rotating shaft relative to the second right rotating rod, the bent portion of the second control part can move in the second control groove. When the bent portion of the second control part moves to one end of the second control groove and is blocked by the second control groove, the first right rotating rod can move to a maximum distance relative to the second right rotating rod in this direction. Similarly, when the bent portion of the second control part moves to the other end of the second control groove and is blocked by the second control groove, the first right rotating rod can move to a maximum distance relative to the second right rotating rod in the other direction. An angle formed by connecting lines between the two maximum distances and the damping rotating shafts is a maximum angle that the first right rotating rod can rotate relative to the second right rotating rod.

A rotation angle of the first right rotating rod relative to the second right rotating rod can be controlled by controlling a length of the second control groove. The longer the second control groove is, the larger the maximum rotation angle is, and vice versa. Preferably, the maximum rotation angle of the first right rotating rod relative to the second right rotating rod is 90 degrees, preferably 5-60 degrees, more preferably 5-45 degrees, further preferably 5-30 degrees.

A lowest position where the first right rotating rod is rotated relative to the second right rotating rod can be set as a position where the ears are located, so that when the ears need to be covered, only the first right rotating rod needs to be rotated to the lowest position. Alternatively, a middle position where the first right rotating rod is rotated relative to the second right rotating rod can be set as the position where the ears are located. Different people have different head sizes, so different rotation angles are needed. Each user can make adjustments according to the own situation.

A pushing force required to push the first right rotating rod to rotate relative to the second right rotating rod can be adjusted by adjusting the right damping rotating shaft. Preferably, the force required to push the first right rotating rod to rotate relative to the second right rotating rod is not greater than 15 N, preferably 1 N-15N, more preferably 2 N-10 N, still more preferably 3 N-8 N, further preferably 5 N-8 N. An acting point of the pushing force is located on the left speaker body 211; the pushing force is perpendicular to the right damping rotating shaft; and the pushing force is perpendicular to a connecting line between the acting point and a center of the right damping rotating shaft.

If the required minimum pushing force is too small, less than 1 N, the first right rotating rod will rotate during use of the user, such as during running, thereby affecting the use. If the required minimum pushing force is too large, greater than 15 N, it is difficult to push, thereby bringing inconvenience to the user.

Figure 7:
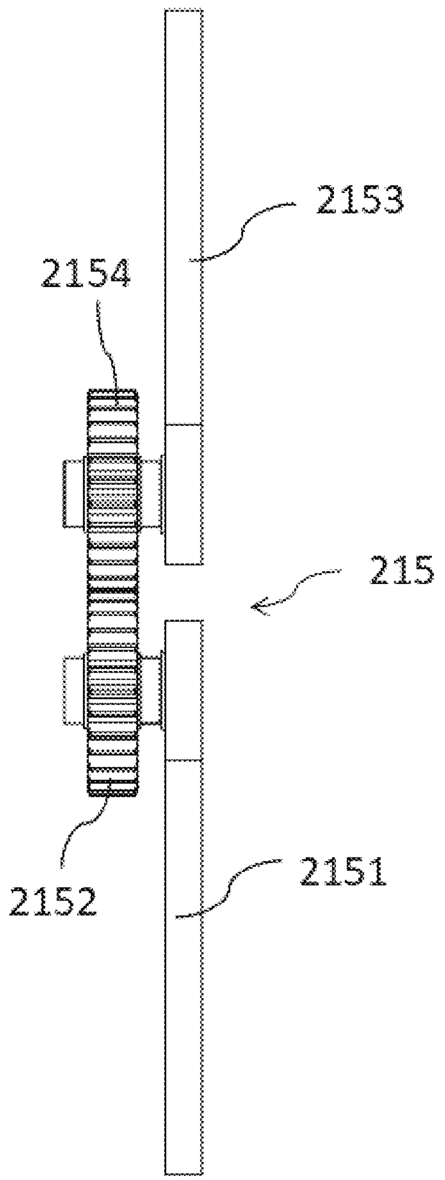
FIG. 7 is a structural schematic diagram of a gear set mechanism according to the present invention.

In one embodiment, referring to FIG. 7, the speaker position adjustment mechanism is a gear set mechanism 215; and the gear set mechanism 215 includes a first rotating arm 2151, a first gear wheel 2152, a second rotating arm 2153 and a second gear wheel 2154.

One end of the first rotating arm 2151 is fixed on the first gear wheel 2152; and the other end of the first rotating arm 2151 is fixed on the first ear hanger body. One end of the second rotating arm 2153 is fixed on the second gear wheel 2154; and the other end of the second rotating arm 2153 is fixed on the second ear hanger body. The first gear wheel 2152 is meshed with the second gear wheel 2154. When the first ear hanger body is pushed by an external force, the first gear wheel 2152 rotates about the second gear wheel 2154, thereby changing the positions of the speaker bodies.

As a modified method, the first rotating arm 2151 and the second rotating arm 2153 are hinged together; the first gear wheel 2152 is meshed with the second gear wheel 2154; the first gear wheel 2152 is fixed on the first rotating arm 2151 and cannot rotate; and the second gear wheel 2154 is rotatably fixed on the second rotating arm 2153. When the first ear hanger body is pushed by an external force, the first gear wheel 2152 drives the second gear wheel 2154 to rotate, thereby changing the positions of the speaker bodies.

Alternatively, the first ear hanger body can be directly fixed on the first gear wheel 2152, to cancel the first rotating arm 2151; and the second ear hanger body can be directly fixed on the second gear wheel 2154, to cancel the second rotating arm 2153.

Apparently, the embodiments described above are only a part of the embodiments of the present invention, but not all of the embodiments. All other embodiments obtained by those ordinary skilled in the art without contributing creative labor based on the embodiments of the present invention shall fall within the protection scope of the present invention.

It should be noted that the terms used here are used for only describing specific embodiments, rather than limiting the exemplary embodiments according to the present application. As used herein, unless otherwise clearly indicated in the context, the singular form is also intended to include the plural form. In addition, it should also be understood that the terms "comprise" and/or "include" used in the description indicate the presence of features, steps, operations, devices, components and/or combinations thereof.

It should be stated that the terms "first" and "second" in the description, claims and accompanying drawings of the present application are used for distinguishing similar objects, and are not necessarily used for describing a specific order or sequence. It should be understood that the data used in this way can be interchanged under appropriate circumstances, so that the embodiments of the present application described here can be implemented in a sequence other than those illustrated or described here.

The above are only the preferred embodiments of the present invention, and shall not be used for limiting the present invention. For those skilled in the art, the present invention can be modified and varied in various forms. Any modification, equivalent substitution, improvement and the like made within the spirit and principles of the present invention shall fall within the protection scope of the present invention.

I claim:

1. A multifunctional bone conduction earphone, comprising:

a left earphone body, comprising a left speaker body and a left ear hanger body, wherein one end of the left ear hanger body is fixedly connected with the left speaker body;

a right earphone body, comprising a right speaker body and a right ear hanger body, wherein one end of the right ear hanger body is fixedly connected with the right speaker body; and a left damping adjustment mechanism arranged on the left ear hanger body, wherein the left damping adjustment mechanism is used for adjusting a position of the left speaker body; and the left ear hanger body comprises a first left ear hanger body and a second left ear hanger body;

the left damping adjustment mechanism comprises a left damping rotating shaft; in the first left ear hanger body and the second left ear hanger body, at least the first left ear hanger body is rotatably and fixedly connected with the left damping rotating shaft; and one end of the first left ear hanger body away from the left damping rotating shaft is fixedly connected with the left speaker body, and the left damping adjustment mechanism further comprises a first left rotating rod and a second left rotating rod; the first left ear hanger body is rotatably and fixedly connected with the left damping rotating shaft through the first left rotating rod; and the second left ear hanger body is fixedly connected with the left damping rotating shaft through the second left rotating rod.

2. The multifunctional bone conduction earphone according to claim 1, wherein a first control groove is formed in the first left rotating rod; a first control part is fixedly arranged on the second left rotating rod; one end of the first control part extends into the first control groove; and the first control part and the first control groove are used for controlling a rotation angle of the first left rotating rod relative to the second left rotating rod.

3. The multifunctional bone conduction earphone according to claim 1, wherein the rotation angle of the first left rotating rod relative to the second left rotating rod is not greater than 60 degrees; a force required for pushing the first left rotating rod to rotate relative to the second left rotating rod is not greater than 15N; an acting point of the pushing force is located on the left speaker body; the pushing force is perpendicular to the left damping rotating shaft; and the pushing force is perpendicular to a connecting line between the acting point and a center of the left damping rotating shaft.

* * * * *